(12) United States Patent
Xu et al.

(10) Patent No.: US 11,902,886 B2
(45) Date of Patent: Feb. 13, 2024

(54) OPTIMIZING NEIGHBOUR REPORT FOR ACCESS POINTS

(71) Applicant: Hewlett Packard Enterprise Development LP, Houston, TX (US)

(72) Inventors: Liao Xu, Beijing (CN); Jianpo Han, Beijing (CN); Zhenlei Wang, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 268 days.

(21) Appl. No.: 17/528,308

(22) Filed: Nov. 17, 2021

(65) Prior Publication Data

US 2023/0156576 A1    May 18, 2023

(51) Int. Cl.
*H04W 48/16* (2009.01)
*H04W 88/08* (2009.01)
*H04W 84/12* (2009.01)

(52) U.S. Cl.
CPC .......... *H04W 48/16* (2013.01); *H04W 88/08* (2013.01); *H04W 84/12* (2013.01)

(58) Field of Classification Search
CPC ...... H04W 48/16; H04W 88/08; H04W 84/12
See application file for complete search history.

(56) References Cited

U.S. PATENT DOCUMENTS

| | | |
|---|---|---|
| 9,497,699 B2 | 11/2016 | Patil et al. |
| 2015/0350974 A1 | 12/2015 | Patil et al. |
| 2018/0368049 A1 | 12/2018 | Patil et al. |
| 2019/0174577 A1 | 6/2019 | Patil et al. |
| 2019/0268892 A1 | 8/2019 | Gidvani et al. |
| 2020/0137550 A1 | 4/2020 | Abhishek et al. |
| 2020/0221378 A1 | 7/2020 | Kneckt et al. |
| 2020/0221545 A1 | 7/2020 | Stacey et al. |
| 2020/0280905 A1 | 9/2020 | Gan et al. |
| 2021/0120432 A1 | 4/2021 | Cariou et al. |
| 2023/0276239 A1* | 8/2023 | Saloni ................. H04W 12/122 370/329 |

* cited by examiner

*Primary Examiner* — Diane D Mizrahi
(74) *Attorney, Agent, or Firm* — Hewlett Packard Enterprise Patent Department

(57) ABSTRACT

Examples of techniques for optimizing Neighbour Report (NR) are disclosed. In an example, a first virtual access point (VAP) operating in a 2.4 Giga Hertz (GHz) or 5 GHz band may determine a first Service Set Identifier (SSID) of the first VAP operating in a 2.4 GHz or 5 GHz band. The first VAP may identify a set of co-located VAPs operating in a 6 GHz band. The first VAP may filter the set of co-located VAPs to obtain a neighbour list comprising a second VAP, from the set, having a second SSID identical to the first SSID. Using the neighbour list, the first VAP may generate a Neighbour Report.

20 Claims, 5 Drawing Sheets

OPTIMIZING NEIGHBOUR REPORT FOR ACCESS POINTS

BACKGROUND

A computer network includes a variety of network devices, such as access points, controllers, gateways, switches, etc., which perform different networking operations, such as network access, authentication, and routing network traffic to provide connectivity. A Wireless Local Area Network (WLAN) may include a plurality of Wireless Access Points (APs), as elements of the WLAN. These APs may act as points of attachment to a wireless network.

WLAN radio measurements can enable any device, AP or client, with the capability to better understand the environment in which it is operating. Different industry standards, such as Institute of Electrical and Electronics Engineers (IEEE) 802.11k, 802.11r allow discovery of information related to best available APs for association/re-association or transitions in a WLAN. Sharing of information related to location, capabilities, and availabilities of different network resources in the WLAN also allows for efficient performance of the resources in the WLAN.

BRIEF DESCRIPTION OF DRAWINGS

The present disclosure, in accordance with one or more various embodiments, is described in detail with reference to the following figures. The figures are provided for purposes of illustration only and merely depict typical or example embodiments.

Figure 1:
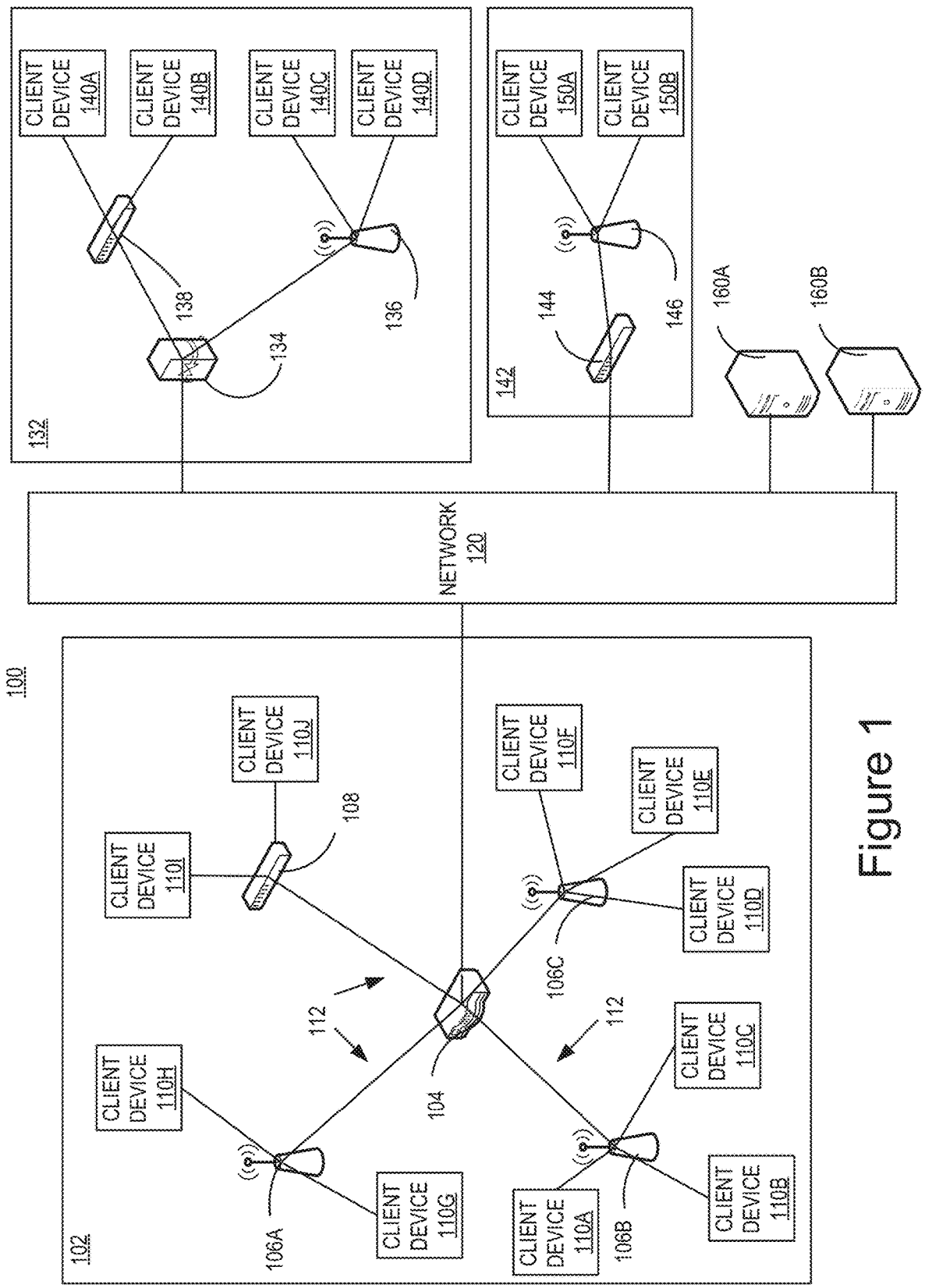
FIG. 1 illustrates an example of a network configuration in which embodiments of the invention may be implemented for an organization, such as a business, educational institution, governmental entity, healthcare facility or other organization.

The figures are not exhaustive and do not limit the present disclosure to the precise form disclosed.

DETAILED DESCRIPTION

Generally, periodic beacons may be used by an AP in a WLAN to advertise its presence. A beacon may include a Service Set Identifier (SSID) and a Basic Service Set Identifier (BSSID) of the AP broadcasting the beacon. The SSID refers to a natural language label that appears to users as a network name, such as name of a Wi-Fi network. The BSSID represents a Media access control (MAC) address of the AP sending the beacon. The beacons may also include information about the operating channel, supported bitrates, parameter sets that indicate channel number, security requirements (WEP or WPA, etc.) of the AP. The AP may send the beacon at an interval of every 100 milk seconds (ms).

Further, probe requests may be used by client devices to discover APs in a WLAN for association/re-association. Generally, a client device may search for a specific network by sending a probe request out on multiple channels that specifies the network name (SSID) of the network and bitrates. On receiving a probe response from an AP with the SSID, authentication and association of the client device may follow.

Prior to association, client devices gather information about the APs by scanning WLAN channels either through passive scanning or active scanning. In passive scanning a client device may tune the client radio into each channel and may wait to listen for beacons on the channel. In an example, the client device may listen for beacons containing SSID that it may have already connected to before. If the client device receives beacons from multiple APs for the same SSID, it may attempt to connect to the AP with the best receiver signal strength indicator (RSSI). In active scanning, the client device may send out probe requests on each channel. These probe requests may contain SSID of a specific network that the client device is looking for. In some examples, the probe requests may also look for any SSID to find out all the SSIDs in the proximity of the client. The probe requests trigger the APs to send out information about themselves. APs respond to probe requests with probe responses, the contents of which are similar to beacons. In some examples, multiple APs operating on a particular channel may respond back to a probe request with a probe response with its SSID, supported bitrates, and security requirements. A client device receiving the probe responses from multiple APs (and/or multiple SSIDs), may use RSSI of the APs to connect to an AP with best signal strength.

The probe response and beacons may also include neighbour reports (NR) including information about neighbouring APs with which a client device may associate/re-associate with. The NR allows the client device to collect information about the neighbouring APs of the AP it is current associated to and this information may be used as identification of potential candidates for a new point of attachment while roaming. The NR may include BSSID information, channel number, and operating class among other parameters.

The NR facilitates in reducing scanning time for the client devices. The client devices instead of engaging in time consuming scanning activity (either actively sending probe requests to APs or passively listening to beacons in every channel) can narrow the list of available APs down to the available neighbours based on the NR. Reduction in scanning time may also reduce consumption of airtime, because active scanning may increase the probe requests/responses manifold and thereby consume considerable airtime which may be otherwise utilized for client data transmission. Further, reduction in scanning time may also reduce power consumption of client devices for scanning the WLAN.

In some examples, an AP may host multiple virtual access points (VAPs). A VAP refers to a software-defined access point implemented within a physical AP. Multiple VAPs may be hosted in a single physical AP and each VAP may function as an independent access point with its own SSID. The same SSID may be used for multiple VAPs, or a unique SSD for each VAR Such VAPs hosted by a single AP may be called co-located VAPs when referenced in relation to each other. In an example, a VAP implemented in the AP may receive a probe request and send a probe response. Further, the VAP may authenticate the client device and may associate with the client device. The IEEE 802.11 standards provide several distinct radio frequency ranges for use in Wi-Fi communications, such as 2.4 GHz, 3.6 GHz, 5 GHz bands, 6 GHz. Each frequency range is divided into multiple channels. In an example, the channels may have a fixed spacing, such as 5 MHz, within a frequency range. Each VAP may be configured to operate in one of these multiple channels.

Consider an AP having multiple co-located VAPs operating in 2.4 GHz, 5 GHz, and 6 GHz bands. For the co-located VAPs in 2.4 GHz, 5 GHz, and 6 GHz bands, a NR may be generally added in beacon and probe response frames on 2.4 GHz and 5 GHz bands to help client devices discover VAPs operating in 6 GHz band without separately scanning the 6 GHz band. For example, a VAP operating in the 2.4 GHz band may send out a beacon or probe response including a NR which includes neighbour information of other VAPs operating in the 6 GHz band. Thus, based on the NR a client device may become aware of neighbour VAPs in the 6 GHz band while scanning (actively through probe request/responses or passively by listening to beacons) the 2.4 GHz or 5 GHz band. As a result, without performing a separate scan (active or passive) of the 6 GHz band, the client device may become aware of available VAPs in the 6 GHz band. Consequently, the NR may reduce/eliminate scanning time in the 6 GHz band thereby reducing wasteful consumption of airtime for scanning and reducing management traffic for AP discovery in the 6 GHz.

The NR generally includes neighbour information of all the co-located VAPs in the 6 GHz band. For example, if there are 16 VAPs operating in 6 GHz, the NR from each VAP operating in the 2.4 GHz or 5 GHz bands generally include neighbour information for all 16 VAPs in the 6 GHz band. Thus, with increase in number of VAPs in the 6 GHz band, length of the NR may increase which may cause the size of the beacons and probe responses to increase. This may cause the beacon and probe response frames in the 2.4 or 5 GHz bands to become bulky and theft transmission time may increase consequently leading to loss of airtime in the 2.4 or 5 GHz bands and adversely affecting channel utilization. In some examples, if 16 VAPs are operating on the 6 GHz band, the length of NR on 2.4 GHz or 5 GHz band may increase up to 46% of total tag parameters' length of a probe response frame, which may approximately double the transmission time of the probe response frame. Thus, airtime and network throughput may be adversely affected.

The present invention proposes optimizing the size of the NR by reducing the number of VAPs for which neighbour information is included in the NR. The size of the NR sent by a VAP in the 2.5/5 GHz band is reduced such that the NR includes information for a VAP (in the 6 GHz band) that has an identical SSID with that of the VAP in the 2.5/5 GHz band. Reducing the NR allows to reduce the size of the beacon and probe responses and thus airtime and network throughput may be improved while providing relevant neighbour information.

In an example, a first VAP operating in a 2.4 GHz or 5 GHz band determines a first SSID of the first VAR The first VAP identifies a set of co-located VAPs operating in a 6 GHz band. The first VAP filters the set of co-located VAPs to obtain a neighbour list comprising a second VAP, from the set, having a second SSID identical to the first SSID. The first VAP generates a Neighbour Report (NR) using the neighbour list. In some examples, the NR is a reduced neighbour report (RNR) according to Institute of Electrical and Electronics Engineers (IEEE) 802.11 standards. The NR generated based on the neighbour list contains neighbour information of a single VAP in the 6 GHz band that has the same SSID as that of the first VAP. Thus, the size of the NR may be reduced which may allow the beacon and probe response frames to be less bulky and their transmission time in the 2.4/5 GHz bands may be reduced. This may in turn reduce loss of airtime in the 2.4/5 GHz band for transmission of the beacons/probe responses and thereby improve channel utilization.

The following detailed description refers to the accompanying drawings. Wherever possible, the same reference numbers are used in the drawings and the following description to refer to the same or similar parts. While several embodiments of the present invention are described herein, modifications, adaptations, and other implementations of those embodiments are possible. Accordingly, the following detailed description does not limit the scope of the present invention. Instead, the proper scope of the present invention is defined by the appended claims.

Before describing embodiments of the systems and methods of the present invention in detail, it is useful to describe an example network installation in which these systems and methods might be implemented in various applications. FIG. 1 illustrates one example of a network configuration 100 in which an embodiment of the present invention may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, campus network, home network or other network installation. The primary site 102 network may be a private network, such as a network that may include security and access controls to restrict access to authorized users of the private network. Authorized users may include, for example, employees of a company at primary site 102, residents of a house, students of an university, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

The controller 104 may be operable to configure and manage network devices, such as at the primary site 102, and may also manage network devices at the remote sites 132, 142. The controller 104 may be operable to configure and/or manage switches, routers, access points, and/or client devices connected to a network. The controller 104 may itself be, or provide the functionality of, an access point. In some examples, the controller 104 may provide functionality of a unicast guerier and responder on behalf of mDNS capable devices and may eliminate the propagation of multicast mDNS traffic in a WLAN.

The controller 104 may be in communication with one or more switches 108 and/or wireless Access Points (WAPs) 106*a-c*. Switches 108 and WAPs 106*a-c* provide network connectivity to various client devices 110*a-j*. Using a connection to a switch 108 or WAP 106*a-c*, a client device 110*a-j* may access network resources, including other devices on the (primary site 102) network and the network 120. Examples of client devices may include: desktop computers, laptop computers, tablet computers, e-readers, netbook computers, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired client devices 110$i$-$j$. Client devices 110$i$-$j$ may connect to the switch 108 and through the switch 108, may be able to access other devices within the network configuration 100. The client devices 110$i$-$j$ may also be able to access the network 120, through the switch 108. The client devices 110$i$-$j$ may communicate with the switch 108 over a wired 112 connection. In the illustrated example, the switch 108 communicates with the controller 104 over a wired 112 connection, though this connection may also be wireless.

WAPs 106$a$-$c$ are included as another example of a point of access to the network established in primary site 102 for wireless client devices 110$a$-$h$. The WAPs 106$a$-$c$ may control network access of the client devices 110$a$-$h$ and may authenticate the client devices 110$a$-$h$ for connecting to the WAPs and through the WAPs, to other devices within the network configuration 100. Each of WAPs 106$a$-$c$ may be a combination of hardware, software, and/or firmware that is configured to provide wireless network connectivity to wireless client devices 110$a$-$h$. In the illustrated example, WAPs 106$a$-$c$ can be managed and configured by the controller 104. WAPs 106$a$-$c$ communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, a conference room, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or WAP 136 in communication with the gateway device 134 over either wired or wireless connections. The switch 138 and WAP 136 provide connectivity to the network for various client devices 140$a$-$d$.

In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150A-B access the network 120. Such a remote site 142 may represent, for example, an individual employee's home or a temporary remote office. The remote site 142 may also be in communication with the primary site 102, such that the client devices 150A-B at remote site 142 access network resources at the primary site 102 as if these client devices 150A-B were located at the primary site 102. The remote site 142 may be managed by the controller 104 at the primary site 102 to make this transparency possible. Once connected to the primary site 102, the remote site 142 may function as a part of a private network provided by the primary site 102. Further, the client devices 110A-J, 140A-D, 150A-B may request and access the services provided by the wired host devices 114 and 148A-B.

The network 120 may be a public or private network, such as the Internet, or other communication network to allow connectivity among the various sites 102, 130 to 142 as well as access to servers 160A-B. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160A-B. Content servers 160A-B may include various providers of multimedia downloadable and/or streaming content, including audio, video, graphical, and/or text content, or any combination thereof. Examples of content servers 160A-B include, for example, web servers, streaming radio and video providers, and cable and satellite television providers. The client devices 110A-J, 140A-D, 150A-B may request and access the multimedia content provided by the content servers 160A-B.

Figure 2:
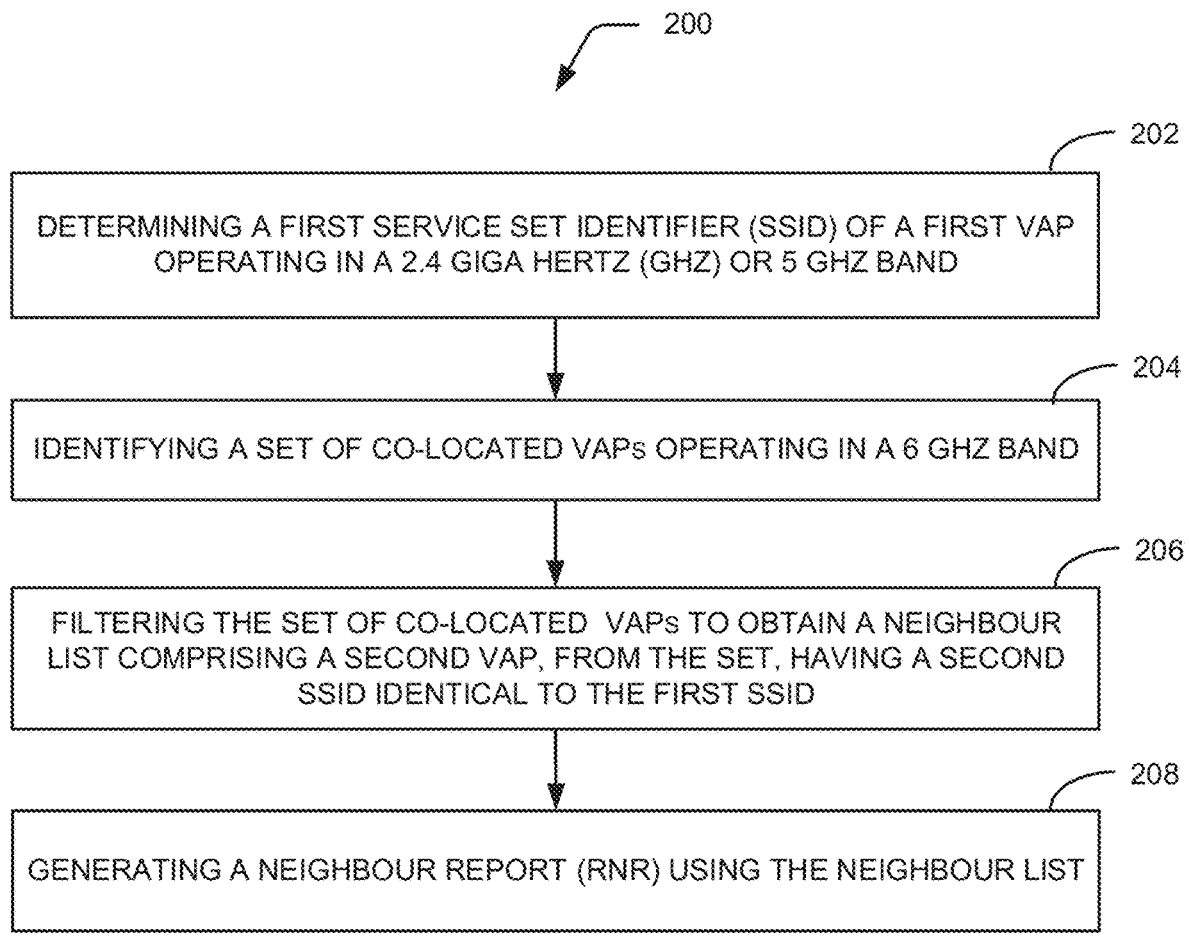
FIG. 2 illustrates an example method for optimizing neighbour report (NR) in accordance with an embodiment of the present invention.

FIG. 2 illustrates an example method 200 for optimizing NR in accordance with an embodiment of the present invention. The method 200 may be executed by an access point, such as an access point 106$a$ of FIG. 1. The method 200 can be implemented by processing resource(s) or computing device(s) through any suitable hardware, a non-transitory machine readable medium, or combination thereof. In an example, the method 200 may be performed by computer-readable instructions, which include instructions stored on a medium and executable by a processing resource, such as a hardware processor, of a computing device/component. It may be understood that processes involved in the method 200 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

A VAP operating in the 2.4 GHz or 5 GHz band may receive a probe request or may periodically send a beacon. In response to receiving a probe request or prior to sending a periodic beacon, the VAP checks its SSID. The VAP may read the SSID from its wireless settings. Referring to FIG. 2, at step 202, the VAO determines its SSID. Hereinafter the VAP is referred as a first VAP and the SSID is referred as a first SSID.

At step 204, the first VAP identifies a set of co-located VAPs operating in a 6 GHz band. Multiple VAPs hosted by a single physical AP may be referred to as co-located VAPs. The first VAP operating in the 2.4/5 GHz band may check SSIDs and operating channels of other co-located VAPs and identify the set of co-located VAPs in the 6 GHz band.

At step 206, the first VAP filters the set of co-located VAPs to obtain a neighbour list comprising a second VAP from the set. Filtering the set of co-located VAPs includes identifying the second VAP from the set of co-located VAPs based on a comparison of SSIDs of the first VAP and the second VAP. The second VAP has a second SSID identical to the first SSID.

At step 208, the first VAP may generate a NR using the neighbour list. In some examples, the NR is a reduced neighbour report (RNR) according to Institute of Electrical and Electronics Engineers (IEEE) 802.11 standards. In an example, the NR generated by the first VAP may include neighbour information, such as operating channel, TBTT information, supported bitrate of the second VAP included in the neighbour list. Thus, the first VAP's NR includes neighbour information of another co-located VAP in the 6 GHz band having a common SSID. This allows the NR to be more compact, because instead of carrying neighbour information of the set of co-located VAPs in the 6 GHz band, information of a co-located VAP in the 6 GHz band having a common SSID is carried by the NR. The first VAP may include the NR its probe response or beacons which may consume less transmission time because of the compact NR. Less transmission time for the probe responses or beacons allows for freeing up of airtime and better channel utilization.

Figure 3:
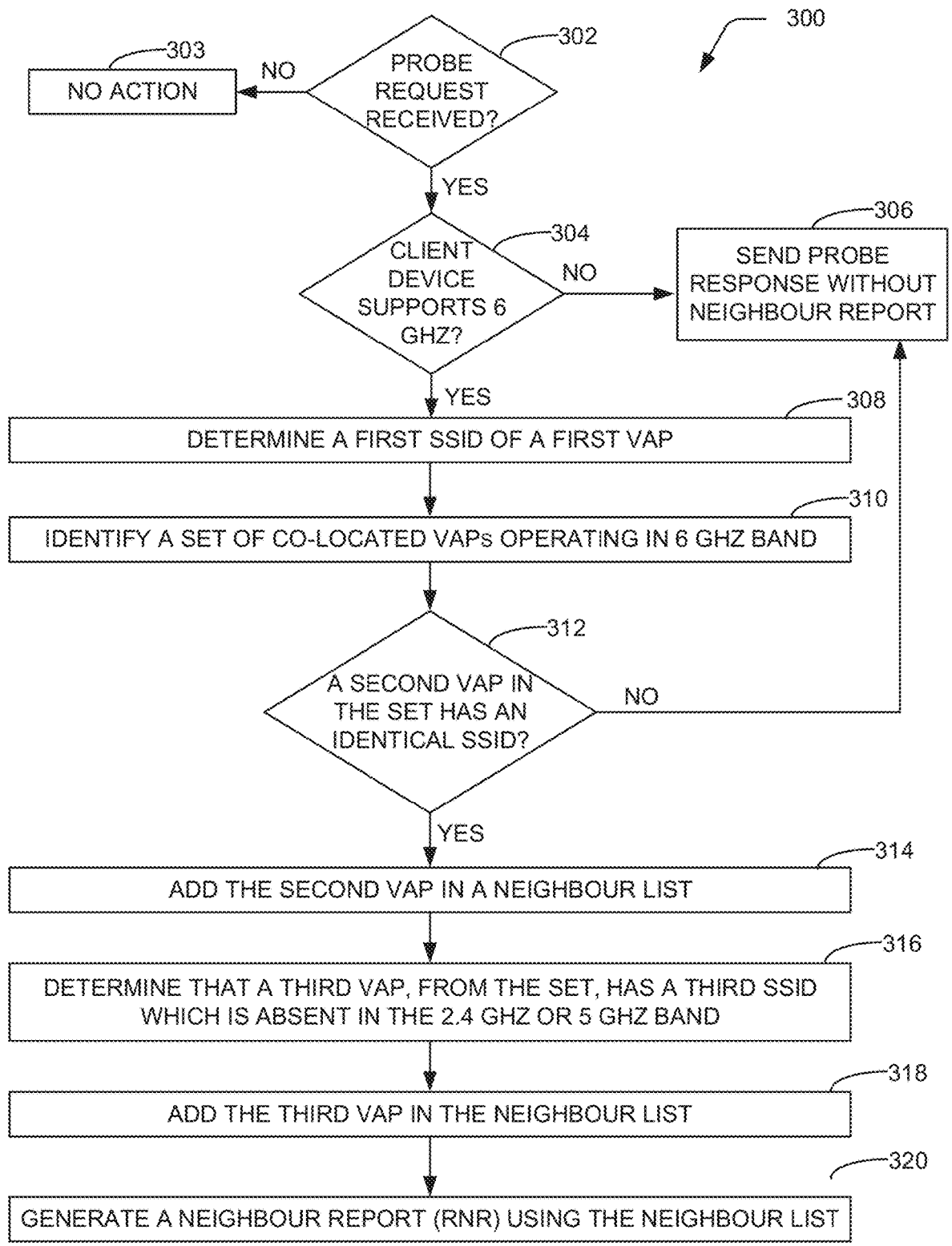
FIG. 3 illustrates an example method for optimizing NR in accordance with an embodiment of the present invention.

FIG. 3 illustrates an example method 300 for optimizing NR in accordance with an embodiment of the present invention. The method 300 may be executed by an access point (AP), such as an access point 106a of FIG. 1. The method 300 can be implemented by processing resource(s) or computing device(s) through any suitable hardware, a non-transitory machine readable medium, or combination thereof. In an example, the method 300 may be performed by computer-readable instructions, which include instructions stored on a medium and executable by a processing resource, such as a hardware processor, of the AP.

Multiple co-located VAPs hosted by the AP may operate in 2.4 GHz, 5 GHz, and 6 GHz bands. A network administrator may configure the VAPs operating in different bands in the AP. The network administrator may modify WLAN settings of the AP to increase or decrease the number of VAPs operating in a band based on a type of the deployment. Also, the network administrator may define a SSID for each of the VAPs. In some examples, two or more VAPs may have identical SSIDs. In an example, VAPs, their operating frequencies, and their SSIDs are illustrated in table 1 below.

TABLE 1

| VAPs | Operating Frequency (GHz) | SSID |
| --- | --- | --- |
| VAP1 | 2.4 | Home |
| VAP2 | 2.4 | Guest |
| VAP3 | 2.4 | Office |
| VAP4 | 6 | Home |
| VAP5 | 6 | Guest |
| VAP6 | 6 | Office |
| VAP7 | 6 | Gym |

Consider that a WLAN network at a site has 7 VAPs co-located in the AP. 3 VAPs operating in the 2.4 GHz band and 4 VAPs operating in the 6 GHz band. Client devices may connect to the "Home" network over either the 2.4 GHz band or 6 GHz band. Similarly, client devices may connect to the "Guest" or "Office" network over either the 2.4 GHz band or 6 GHz band. The "Guest" SSID may identify a Wi-Fi network for frequently roaming guest devices in a site, the "Office" SSID may identify a Wi-Fi network for devices connecting to an office network, the "Home" SSID may identify a Wi-FI network for devices which remain primarily in the same site for extended time periods. The "Guest", "Home", "Office", and "Gym" networks may have different security settings, bandwidth configuration, and bitrate from each other.

Referring to FIG. 3, at step 302, a first VAP checks whether a probe request is received from a client device. The first VAP is a VAP operating in the 2.4/5 GHz band, such as the VAP1 in the example of table 1 operating at 2.4 GHz band. The first VAP may have other co-located VAPs operating in 6 GHz band. The client device may send the probe request to scan a 2.4 GHz band or 5 GHz band in which the first VAP is operating. The probe request scans the network broadcast by the VAP or its co-located VAPs.

In response to non-receipt of a probe request ('NO' branch from step 302), at step 303 no actions of the method 300 are invoked. In response to receiving the probe request ('YES' branch from step 302), at step 304 the first VAP checks whether the client device supports operation in the 6 GHz band. The first VAP may check historical information associated with the client device stored in the first VAR For example, if the client device had previously scanned the 6 GHz band, then the first VAP determines that the client device supports the 6 GHz band. The first VAP is configured to store MAC addresses of client devices which connects to it or to its co-located VAPs. If a client device within a range of the first VAP scans the 6 GHz band or connects to a co-located VAP in the 6 GHz band, the first VAP marks the client device as supporting 6 GHz band. The first VAP may store historical information of MAC addresses of client devices which are marked as supporting 6 GHz band. When the first AP receives the probe request from a client device, the first VAP checks the historical information. If MAC address of the client device is present in the historical information and is marked as supporting 6 GHz band, the first VAP determines that the client device supports operation in the 6 GHz band.

In response to determining that the client device does not support operation in the 6 GHz band ('NO' branch from step 304), at step 306 the first VAP may send a probe response without an NR. In an example, a neighbour report information element may be removed from the probe response sent by the first VAP. Thus, the probe response becomes more compact and consumes less transmission time thereby allowing better channel utilization. Further, though no neighbour information of co-located VAPs in the 6 GHz band is shared with the probe response in the 2.4/5 GHz, it does not adversely affect performance, since the neighbour information of VAPs in the 6 GHz is irrelevant to the client device which does not support operation in the 6 GHz band.

In response to determining that the client device supports operation in the 6 GHz band ('YES' branch from step 304), at step 308 the first VAP checks its SSID. The SSID may be specified by the network administrator. In the example of table 1, the VAP1 may determine that it has an SSID "Home". In an example, step 308 may also be invoked in response to a beacon being sent by the first VAR In response to the beacon being sent by the first VAP, a timer for a target beacon transmission time (TBTT) may be reset to a predefined value. Resetting of the timer may indicate the first VAP to initiate the step 308. The TBTT is referred to as a time interval between transmission of two successive beacons by the first VAP. In an example, the predefined value to which the timer is reset is 102 Milliseconds. The timer counts down from the predefined value to zero. In response to the timer reaching zero, the first VAP may send out a beacon and reset the timer to the predefined value.

At step 310, the first VAP may identify a set of co-located VAPs operating in a 6 GHz band. In an example, the first VAP may check a list of VAPs hosted by the AP. From the list of VAPs hosted by the AP, the first VAP may select VAPs operating in the 6 GHz band. Referring to table 1, the first VAP may identify that VAP4-VAP7 are operating in the 6 GHz band. Thus, in the example, VAP4-VAP7 may be included in the set of co-located VAPs operating in the 6 GHz band.

At step 312, the first VAP checks if another VAP, from the set of co-located VAPs, has an identical SSID as the first SSID. In an example, the first VAP may check the SSIDs of the set of co-located VAPs and filter out another VAP from the set of co-located VAPs having an SSID identical to the first SSID. The other VAP is called a second VAP having a second SSID identical to the first SSID. Referring to table 1, the VAP1 may identify VAP4 as the second VAP, both having identical SSID "home". Table 2 below shows VAPs in the 2.4 GHz and 6 GHz bands having identical SSIDs.

TABLE 2

| VAPs | Identical SSID |
|---|---|
| VAP1, VAP4 | Home |
| VAP2, VAP5 | Guest |
| VAP3, VAP6 | Office |

In response to determining that the second VAP has a second SSID identical to the first SSID ('Yes' branch from step 312), at step 314, the first VAP adds the second VAP in a neighbour list of the first VAP. The neighbour list represents a list of co-located VAPs operating in the 6 GHz band and having an identical SSID as that of the first VAP. The neighbour list includes VAPs in the 6 GHz band which broadcast the same Wi-Fi network as that of the first VAP in the 2.4/5 GHz band. In some examples, there may be more than one VAP in the 6 GHz band having an SSID identical to the SSID of the first VAR In such cases multiple VAPs in the 6 GHz band having the identical SSIDs are included in the neighbour list. In the example of table 1, the neighbour list of VAP1 includes VAP4. Likewise, a neighbour list of VAP2 includes VAP5 and a neighbour list of VAP3 includes VAP6.

In response to determining that there is no VAP in the 6 GHz band that has an identical SSID as that of the first SSID ('No' branch from step 312), at step 306, a probe response is sent without the neighbour report. In another example, the first VAP may send a subsequent beacon without the neighbour report. Sending the probe response or beacon without the neighbour report may reduce the size of the probe response or beacon and thereby reduce the transmission time of the probe response or beacon. This may allow increase of available airtime for transmission of client data and improve channel utilization for the 2.4/5 GHz band.

Further, at step 316, the first VAP also checks whether all SSIDs of the set of co-located VAPs in the 6 GHz band are present in the 2.4/5 GHz band. The first VAP may compare the SSIDs in the 2.4/5 Ghz band with the SSIDs in the 6 GHz band. If there is an additional SSID in the 6 GHz band which is not present in the 2.4/5 GHz band, then the first VAP identifies the additional SSID as a third SSID and the VAP broadcasting the SSID as a third VAR With reference to table 1, the first VAP may determine that SSID "Gym" is absent in the 2.4 GHz band and therefore may identify that "Gym" is an additional SSID.

At step 318, the first VAP may add the third VAP in the neighbour list. Thus, VAP1 may add VAP7 in its neighbour list. As a result, the neighbour list of the first VAP, i.e., VAP1, would include VAP4 and VAP7. Table 3 below shows the neighbour list of each of the VAPs of table 1 operating in the 2.4 GHz band.

TABLE 3

| VAPs | Neighbour list |
|---|---|
| VAP1 | VAP4 & VAP7 |
| VAP2 | VAP5 & VAP7 |
| VAP3 | VAP6 & VAP7 |

As may be noted from table 3, VAP7 which is the VAP with an SSID absent in the 2.4 GHz band is included in the neighbour list of all the VAPs in the 2.4 GHz band.

At step 320, an NR is generated using the neighbour list. In an example, the NR includes information of each of the VAPs in the neighbour list. For example, TBTT information and operating channel information of each of the VAPs in the neighbour list may be included in the NR. Thus, the NR does not contain information of all the co-located VAPs operating in the 6 GHz band. Rather, the NR includes information of select VAPs included in the neighbour list. With reference to the example of table 1, the NR generated by VAP1 may include information of VAP4 and VAP7 instead of all the VAPs in the 6 GHz band. Thus, the NR is compact and may have a lower transmission time which may free up airtime for client data transmission and improve channel utilization of the 2.4 GHz and 5 GHz bands.

Figure 4:
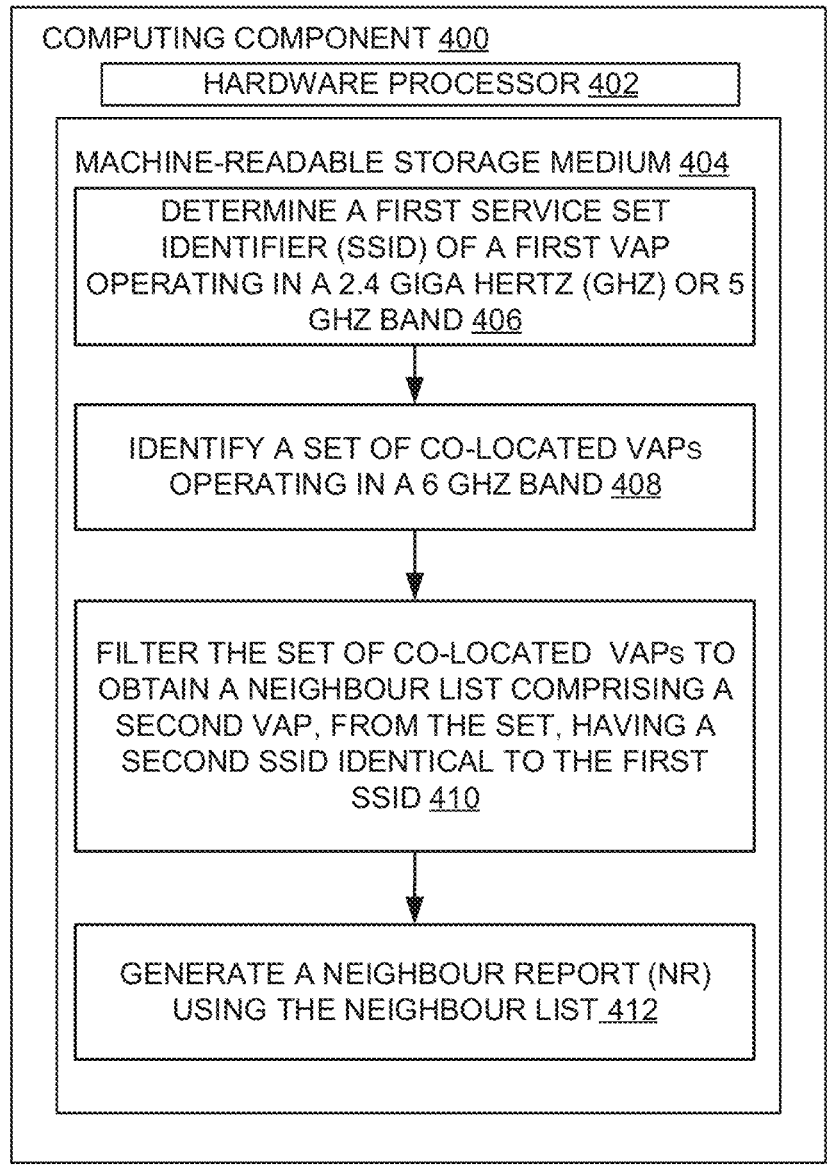
FIG. 4 is a block diagram of an example computing component for optimizing neighbour report (NR), in accordance with an embodiment of the present invention.

FIG. 4 is a block diagram of an example computing component 400 for optimizing neighbour report (NR), in accordance with an embodiment of the present invention. In an example, the computing component 400 may function as an AP as described above in reference to FIG. 1.

In the example implementation of FIG. 4, the computing component 400 includes a hardware processor 402 and a machine-readable storage medium 404. The hardware processor 402 may be one or more central processing units (CPUs), semiconductor-based microprocessors, and/or other hardware devices suitable for retrieval and execution of instructions stored in the machine-readable storage medium 404. The hardware processor 402 may fetch, decode, and execute instructions, such as instructions, to control processes or operations for optimizing NR.

In some embodiments, machine-readable storage medium 404 may be a non-transitory storage medium, where the term "non-transitory" does not encompass transitory propagating signals. As described in detail below, machine-readable storage medium 404 may be encoded with executable instructions for performing operations for optimizing NR.

At block 406, the hardware processor 402 may execute instructions stored in the machine-readable storage medium 404 to determine a first SSID of a first VAP operating in a 2.4 GHz or 5 GHz band.

At block 408, the hardware processor 402 may execute instructions stored in the machine-readable storage medium 404 to identify a set of co-located VAPs operating in a 6 GHz band. Multiple VAPs hosted by a single physical AP may be referred to as co-located VAPs. The first VAP operating in the 2.4/5 GHz band may check SSIDs and operating channels of other co-located VAPs and identify the set of co-located VAPs in the 6 GHz band.

At block 410, the hardware processor 402 may execute instructions stored in the machine-readable storage medium 404 to filter the set of co-located VAPs to obtain a neighbour list comprising a second VAP, from the set, having a second SSID identical to the first SSID. Filtering the set of co-located VAPs includes identifying the second VAP from the set of co-located VAPs based on a comparison of SSIDs of the first VAP and the second VAP. The second VAP has a second SSID identical to the first SSID.

At block 412, the hardware processor 402 may execute instructions stored in the machine-readable storage medium 404 to generate a NR using the neighbour list. In some examples, the NR is a reduced neighbour report (RNR) according to Institute of Electrical and Electronics Engineers (IEEE) 802.11 standards. In an example, the NR generated may include neighbour information, such as operating channel, TBTT information, supported bitrate of the second VAP included in the neighbour list. Thus, the first VAP's NR includes neighbour information of another co-located VAP in the 6 GHz band having a common SSID. This allows the NR to be more compact, because instead of carrying neighbour information of the set of co-located VAPs in the 6 GHz band, information of a single co-located VAP in the 6 GHz band having a common SSID is carried by the NR. The first VAP may include the NR in its probe response or beacons which may consume less transmission time because of the compact NR. Less transmission time for the probe responses or beacons allows for freeing up of airtime and better channel utilization.

Figure 5:
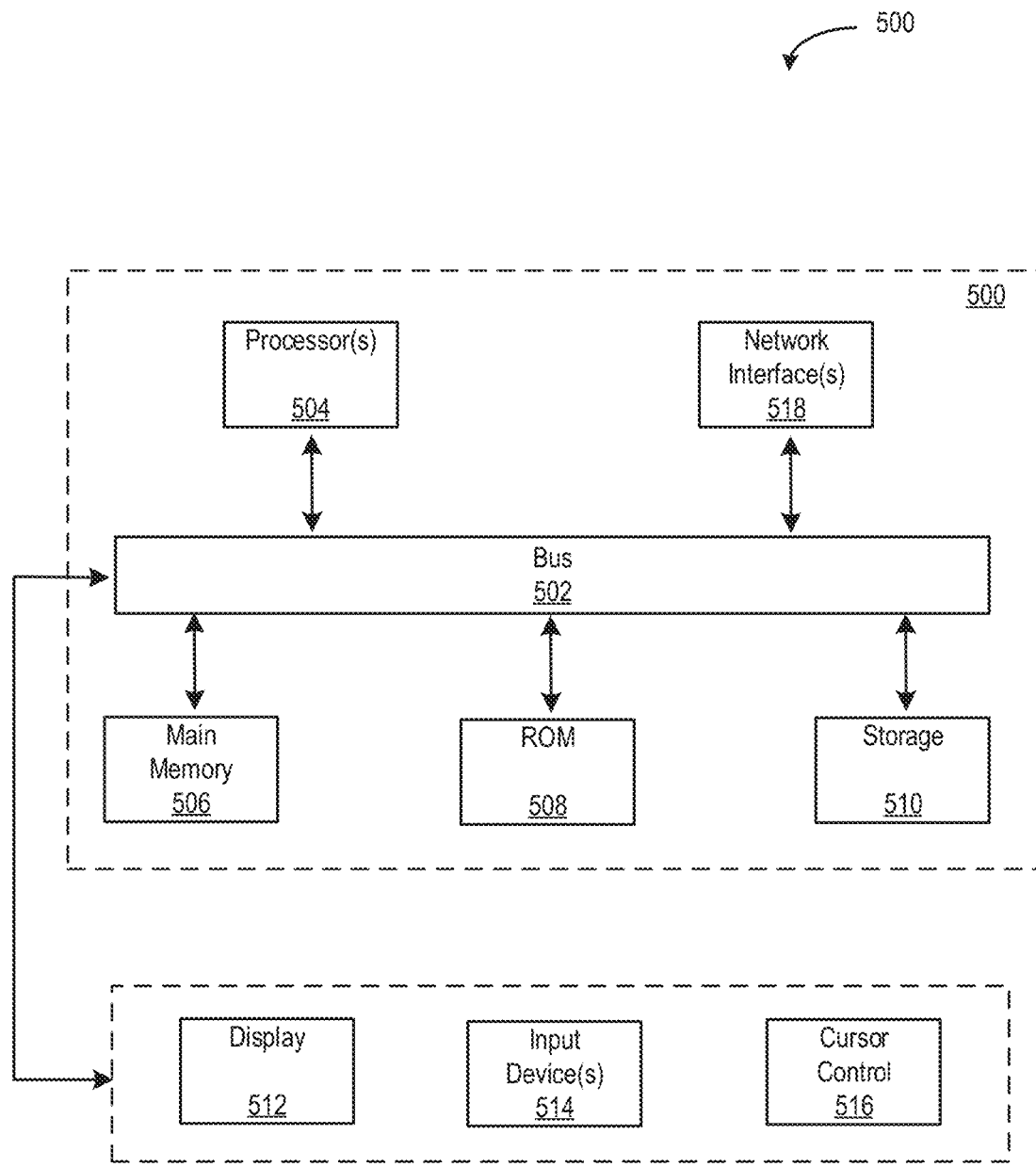
FIG. 5 depicts a block diagram of an example system in which the embodiments described herein may be implemented.

FIG. 5 depicts a step diagram of an example computer system 500 in which the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518. The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process steps may be omitted in some implementations. The methods and processes described herein are also not limited to any particular sequence, and the steps or states relating thereto can be performed in other sequences that are appropriate, or may be performed in parallel, or in some other manner. Steps or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

Although implementations of present invention have been described in language specific to structural features and/or methods, it is to be noted that the present invention is not necessarily limited to the specific features or methods described. Rather, the specific features and methods are disclosed and explained in the context of a few implementations for the present invention.

We claim:

1. A method comprising:
  determining, by a first virtual access point (VAP) operating in a 2.4 Giga Hertz (GHz) or 5 GHz band, a first Service Set Identifier (SSID) of the first VAP;
  identifying, by the first VAP, a set of co-located VAPs operating in a 6 GHz band;

filtering, by the first VAP, the set of co-located VAPs to obtain a neighbour list comprising a second VAP, from the set, having a second SSID identical to the first SSID; and generating, by the first VAP, a Neighbour Report (NR) using the neighbour list.

2. The method of claim 1, further comprising:

determining that a third VAP, from the set of co-located VAPs, has a third SSID which is absent in the 2.4 GHz or 5 GHz band; and adding the third VAP in the neighbour list.

3. The method of claim 1, further comprising:

determining that the first SSID is absent in the 6 GHz band; and removing the NR from a beacon frame or probe response of the first VAP.

4. The method of claim 1, further comprising:

determining, based on historical information, that a client device supports transmission over the 6 GHz band; and sending the NR to the client device over the 2.5 GHz or 5 GHz band, in response to receiving a probe request from the client device.

5. The method of claim 1, further comprising sending the NR in a beacon frame transmitted on the 2.4 GHz or 5 GHz band.

6. The method of claim 1, wherein the first VAP and the set of co-located VAPs are hosted in a single physical AP.

7. The method of claim 1 wherein the NR comprises a Target Beacon Transmission Time (TBTT) information of the second VAP.

8. An access point (AP) comprising:

a processor; and a memory coupled to the processor, the memory storing instructions executable by the processor to:

determine a first Service Set Identifier (SSID) of a first virtual access point (VAP) operating in a 2.4 Gigs Hertz (GHz) or 5 GHz band;

identify a set of co-located VAPs operating in a 6 GHz band;

filter the set of co-located VAPs to obtain a neighbour list comprising a second VAP, from the set, having a second SSID identical to the first SSID; and generate a Neighbour Report (NR) using the neighbour list.

9. The AP of claim 8, wherein the processor is further to:

determine that a third VAP, from the set of co-located VAPs, has a third SSID which is absent in the 2.4 GHz or 5 GHz band; and add the third VAP in the neighbour list.

10. The AP of claim 8, wherein the processor is further to:

determine that the first SSID is absent in the 6 GHz band; and removing the NR from a beacon frame or probe response of the first VAP.

11. The AP of claim 8, wherein the processor is further to:

determine, based on historical information, that a client device supports transmission over the 6 GHz band; and send the NR to the client device over the 2.5 GHz or 5 GHz band, in response to receiving a probe request from the client device.

12. The AP of claim 8, wherein the processor is further to send the NR in a beacon transmitted on the 2.4 GHz or 5 GHz band.

13. The AP of claim 8, wherein the NR comprises a Target Beacon Transmission Time (TBTT) information of the second VAP.

14. A non-transitory computer-readable medium comprising computer-readable instructions, the computer-readable instructions when executed by a processor, cause the processor to:

determine a first Service Set Identifier (SSID) of a first virtual access point (VAP) operating in a 2.4 Giga Hertz (GHz) or 5 GHz band;

identify a set of co-located VAPs operating in a 6 GHz band;

filter the set of co-located VAPs to obtain a neighbour list comprising a second VAP, from the set, having a second SSID identical to the first SSID; and generate a Neighbour Report (NR) using the neighbour list.

15. The non-transitory computer-readable medium of claim 14, further comprising computer-readable instructions to:

determine that a third VAP, from the set of co-located VAPs, has a third SSID which is absent in the 2.4 GHz or 5 GHz band; and add the third VAP in the neighbour list.

16. The non-transitory computer-readable medium of claim 14, further comprising computer-readable instructions to:

determine that the first SSID is absent in the 6 GHz band; and remove the NR from a beacon frame or probe response of the first VAP.

17. The non-transitory computer-readable medium of claim 14, further comprising computer-readable instructions to:

determine, based on historical information, that a client device supports transmission over the 6 GHz band; and send the NR to the client device over the 2.5 GHz or 5 GHz band, in response to receiving a probe request from the client device.

18. The non-transitory computer-readable medium of claim 14, further comprising computer-readable instructions to send the NR in a beacon frame transmitted on the 2.4 GHz or 5 GHz band.

19. The non-transitory computer-readable medium of claim 14, wherein the first VAP and the set of co-located VAPs are hosted in a single physical AP.

20. The non-transitory computer-readable medium of claim 14, wherein the NR comprises a Target Beacon Transmission Time (TBTT) information of the second VAP.

* * * * *